March 7, 1944. L. J. BECKHAM 2,343,362
SULPHITATION OF ORGANIC COMPOUNDS
Filed Dec. 30, 1941
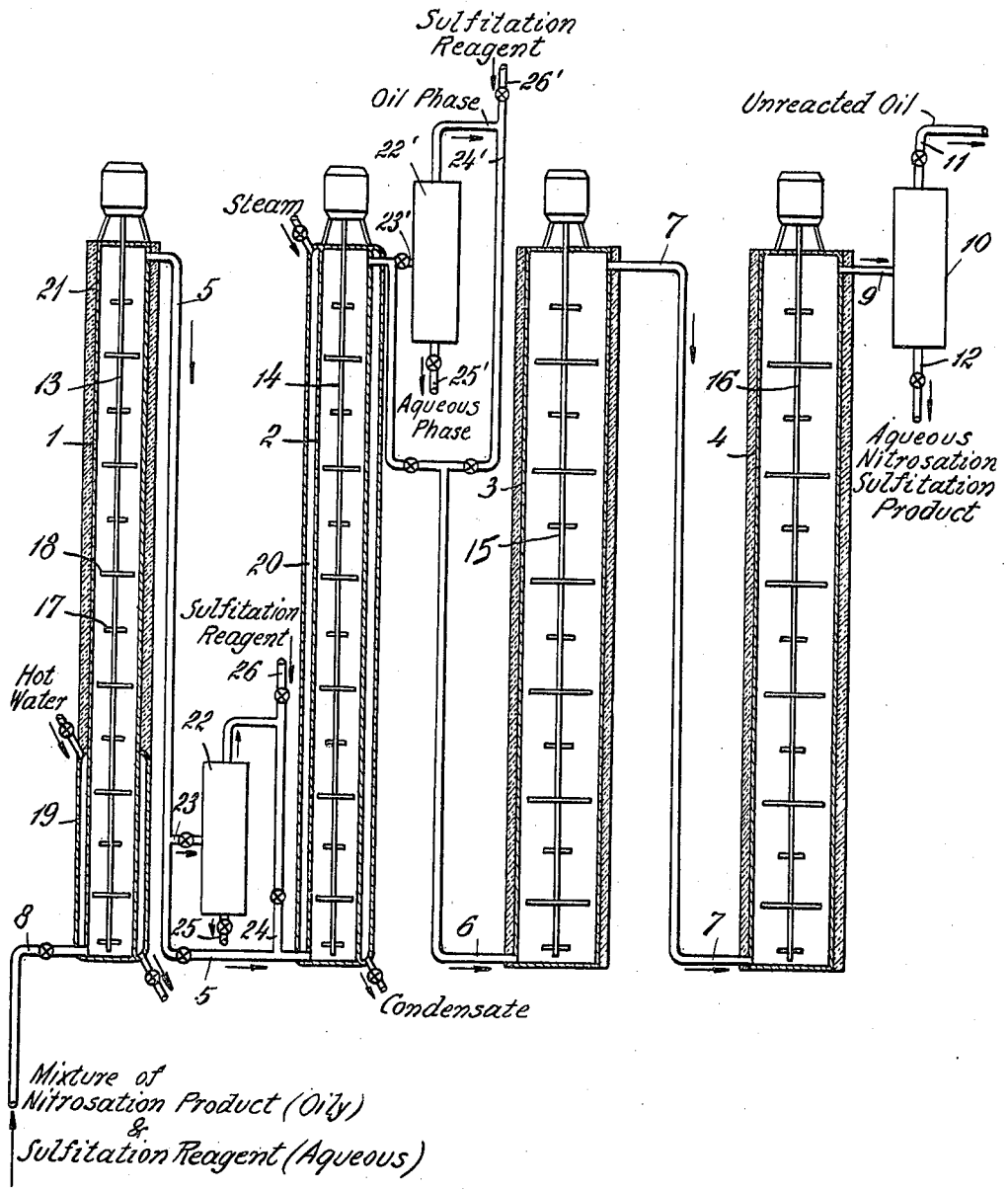
INVENTOR
LELAND J. BECKHAM
BY
ATTORNEY Patented Mar. 7, 1944

2,343,362

UNITED STATES PATENT OFFICE 2,343,362

SULPHITATION OF ORGANIC COMPOUNDS

Leland James Beckham, Geddes, N. Y., assignor to The Solvay Process Company, New York, N. Y., a corporation of New York Application December 30, 1941, Serial No. 424,943

10 Claims. (Cl. 260—513)

This invention relates to the production of organic sulphonates.

In my application Serial No. 221,707, filed July 28, 1938, issued as U. S. P. 2,265,993 on December 16, 1941, I have described the manufacture of organic sulphonate products by forming an addition product of a nitrosyl halide with an unsaturated aliphatic compound or with mixtures thereof and reacting the addition product with alkali sulphite to replace the halogen atom with a sulphonate radical. The products of this process comprise mixtures of sulphonated ketones, sulphonated amines, sulphonated alkylidene sulphamates, sulphonated alkyl sulphamates, and bisulphite addition products of sulphonated alkylidene sulphamates. The products prepared from olefins containing between 10 and 30 carbon atoms in the molecule and especially the products prepared from such olefins containing at least one straight carbon chain of at least 8 carbon atoms are especially valuable as detergents, wetting agents, dispersing agents, emulsifying agents and the like.

The products prepared in the above manner are designated herein "nitrosation-sulphitation products."

My application Serial No. 424,940 of even date, entitled "Derivatives of unsaturated compounds and method of making" relates to the manufacture of nitrosation-sulphitation products from carboxylic-substituted unsaturated hydrocarbons and mixtures thereof, particularly olefinic carboxylic compounds containing between 10 and 30 carbon atoms per olefinic linkage.

The NOCl addition products are believed to comprise largely organic nitroso chloro compounds having the chlorine atom and nitroso group upon adjacent carbon atoms, the isomeric oximes, and probably the chloro derivatives formed by substitution of chlorine for a remaining hydrogen of the nitroso-substituted carbon of the nitroso chloro compounds, and dimers of the nitroso chloro compounds. A considerable proportion of the NOCl addition product reacts further under the conditions of nitrosation to lose nitrogen and form products such as alpha-chlorohydrins and alpha-chloro ketones. Hence the nitrogen content of the adduct as a whole may correspond to only 0.6 to 0.7 atoms per ethylenic group.

The present invention is directed to improvements in the process of making nitrosation-sulphitation products whereby improved yields of the valuable sulphonate products may be obtained and whereby substantial improvements in quality of products may be realized.

In accordance with the present invention an organic addition product of nitrosyl chloride with an organic compound containing at least one non-aromatic C=C linkage is subjected to partial sulphitation by treatment with an alkali sulphite in an aqueous medium at a low temperature, and is then subjected to further sulphitation by treatment with an alkali sulphite in an aqueous medium at a substantially higher temperature. Normally the partial sulphitation is effected at a temperature below 50° C. and the final sulphitation is effected at a temperature of at least 65° C.

It is preferred to conduct the partial sulphitation at a temperature between 30° C. and 50° C. for at least a quarter hour and to raise the temperature gradually at a rate not exceeding two degrees centigrade per minute to a final sulphitation temperature between 65° C. and 105° C. so that 10% to 50% of the sulphitation takes place at a temperature below 65° C. The final sulphitation may be conducted for a number of hours depending upon the yield of sulphitation product required and the identity of the nitrosyl chloride olefin addition product. Thus an addition product derived from cetene may require 3 or 4 hours for a good yield of the desired sulphitation product, whereas an addition product from a mixture of olefins of petroleum derivation may require 8 or 10 hours for equivalent results at the same temperature. The yield can be slightly improved by extending the reaction period further, for instance to 24 or 48 hours.

The water-soluble sulphitation products formed in the partial sulphitation step may be recovered separately or may be permitted to remain in the product. The soluble products of this treatment possess substantially more color than products of the later stage and consequently if it is desired to produce a product of especially good color, the water-soluble products of the partial sulphitation may be separated from the water-insoluble material before the latter is subjected to the final sulphitation.

While I do not wish to be limited to any particular theory of reaction, I believe that reactive constituents in the nitrosyl chloride addition products, as compared with their sulphitation products, are thermally unstable, at least in the presence of the sulphitation reagent. However, their relatively high activity permits them to be sulphitated at low temperatures and thus stabilized against the higher temperatures of the final treatment. Moreover there appear to be several degrees of stability exhibited by the constituents of the addition product so that substantial sulphitation at progressively increasing temperatures has a marked limiting effect on thermal decomposition. This holds true not only for the addition products of olefin mixtures but for the addition products of substantially pure olefins as well.

The process is especially useful for sulphitation of the nitrosyl chloride addition products of olefins and their carboxylic derivatives, of the types described in the aforementioned applications and particularly for the manufacture of detergent products from nitrosyl chloride addition products of olefin mixtures containing monoolefins and saturated hydrocarbons, derived from natural or synthetic (Fischer-Tropsch) petroleum immediately or by thermolytic treatments. Thermolytic treatments which have been found to yield large proportions of the desired olefins are catalytic and non-catalytic cracking, catalytic dehydrogenation, and combinations thereof. The preferred olefinic mixtures, comprising for the most part hydrocarbons containing between 10 and 30 carbon atoms per molecule may be segregated from less desirable products of the treatment by fractional distillation. Non-olefinic hydrocarbons may be permitted to remain and may be separated after the sulphitation treatment as water-insoluble oils. The petroleum may be fractionally distilled prior to the thermolytic treatment to provide an oil containing an increased proportion of the hydrocarbons containing 10 and more carbon atoms per molecule.

Exampes of suitable olefins are cetene derived from spermaceti (and comprising for the most part cetene-1), 2-methyl pentadecene-2, dodecene-1. pentadecene-7, tricosene-11, nondecene-9, 10-methyl nondecene-9. and olefin-containing mixtures obtained by cracking topped, crude, natural or synthetic petroleum or by dehydrogenating a petroleum distillate such as gas oil or by reacting carbon monoxide and hydrogen in the presence of a catalyst such as cobalt (the Fischer-Tropsch synthesis). Some synthetic petroleums contain relatively high proportions of olefins as compared with natural petroleum and hence are more suitable for use without a concentration or thermolysis to increase the olefin content.

Examples of suitable carboxylic-substituted unsaturated hydrocarbons are butyl oleate, oleic acid, methyl oleate, isopropyl oleate, allyl stearate, allyl laurate, di-n-octyl-(octenyl, nonenyl, decenyl, or undecenyl) succinate, oleic acid amide, N-methyl oleic acid amide, N-dimethyl oleic acid amide, oleic acid anhydride, oleic acid chloride, oleic acid nitrile, N-allyl lauric acid amide, N-oleyl butyric acid amide, N-methyl N-oleyl propionic acid amide, N-ethyl N-oleyl acetic acid amide, N-methyl N-lauryl 4-hexenoic acid amide, N-decyl 3-pentenoic acid amide, 3-methyl-4-dimethyl-cyclopentane-1-carboxylic acid ester of allyl alcohol. Δ²-3-methyl-4-dimethyl-cyclopentene-1-carboxylic acid ester of butanol-1.

The process of the present invention is applicable to sulphitations involving as sulphitation agents alkali sulphites in general; for example sodium sulphite, potassium sulphite, ammonium sulphite, or the corresponding acid sulphites; or mixtures of alkali bisulphites and normal sulphites, as described and claimed in my application Serial No. 424,941 of even date, entitled "Organic sulphonates and method of making."

The sulphitation is conducted with the sulphitation agent in an aqueous solution, preferably with a water-soluble organic solvent as described and claimed in my application Serial No. 424,942 of even date, entitled "Manufacture of organic sulphonates."

The proportions of sulphitation agent may be varied, widely, for instance between one and ten mols of sulphite, preferably between two and one-half and five mols for each mol of nitrosation product. However, when it is desired to separately recover the relatively colorless products of the final sulphitation, the proportion of sulphite employed in the initial low temperature treatment may be limited advantageously to between 1½ mols and 3 mols per mol of nitrosation product present in order to conserve the reagent and for the same reason the total proportion of sulphite employed in both stages may be the same as in the process which does not involve separation of the products of the low temperature treatment.

While the process of the present invention may be conducted at superatmospheric or subatmospheric pressure, pressures approximating atmospheric pressure are satisfactory.

The process of the present invention may be conducted batchwise in simple apparatus such as a closed kettle provided with heating means such as a steam coil or jacket and efficient agitating means. For conducting the process as a continuous operation, apparatus such as that illustrated diagrammatically in the accompanying drawing may be used.

This apparatus comprises a series of tubular vessels 1, 2, 3, and 4 connected by conduits 5, 6, and 7 and provided with an inlet 8 for reaction mixture and an outlet 9 leading to a decanter 10, provided with high and low outlets 11 and 12. The vessels 1, 2, 3, and 4 are provided with suitable agitating devices such as the motor-driven agitators 13, 14, 15, and 16. These devices may comprise arms 17 and discs 18, the latter serving the two-fold function of assisting the agitation and providing barriers or baffles to restrain intermixing of mixture in the several sections of the apparatus and to thus ensure a uniform period of treatment of each increment of mixture passing through the unit.

Vessels 1 and 2 are shown as provided with a short jacket 19 and a long jacket 20, respectively, each having inlets and outlets for heating fluid. The remainder of vessel 1 and vessels 3 and 4 are shown as provided with thermal insulation 21. The jackets represent zones of rising temperature and the thermal insulation represents zones of approximately constant temperature. Obviously additional heating means may be provided, if desired, to assist the thermal insulation in maintaining the elevated temperature in the latter zones.

Between vessel 1 and vessel 2 and between vessels 2 and 3 decanters 22 and 22' are provided connected to lines 5 and 6 by branch lines 23 and 24 and 23' and 24', respectively, having suitable shut-off valves. Lines 5 and 6 also have shut-off valves intermediate branch lines 23 and 24 and 23' and 24'. These valves can be adjusted to compel all, none, or any desired proportion of the liquid to flow through decanters 22 and 22'. The decanters 22 and 22' have outlets 25 and 25' to permit withdrawal of as much of the initial reaction products as desired. Inlets 26 and 26' on lines 24 and 24' are provided for introducing make-up sulphitation reagent. If it is not desired to provide for separate withdrawal of products of the low temperature treatment prior to heating up to the final treatment temperature, decanter 22 and its appurtenances are unnecessary. Similarly, if no provision for separate withdrawal of products after heating up but prior to final elevated temperature treatment in units 3 and 4 is desired, decanter 22' and its appurtenances are unnecessary. Finally, if a separation farther along in the treatment is preferred, similar equipment may be provided at the desired location.

In the apparatus illustrated the apparatus is proportioned so that liquid is in each of vessels 1 and 2 about an hour, and in each of vessels 3 and 4 about two hours. Thus it is in the heated zone surrounded by jacket 19 for about 15 minutes, the thermally insulated zone of low temperature treatment for about 45 minutes, the heated zone surrounded by jacket 20 for about one hour, and the final treatment zone for about four hours.

The following examples illustrate the practical application of the invention.

Example 1

A reaction mixture is prepared comprising the nitrosyl chloride addition product of a $C_{14}$ to $C_{23}$ olefin mixture obtained by cracking a Pennsylvania petroleum and fractionating the cracking product, and a sulphitation reagent, having the following constitution per mol of olefin used:

|  | Mols |
|---|---|
| Nitrosyl chloride addition product | 0.74 |
| $H_2O$ | 54 |
| $Na_2SO_3$ | 3 |
| Isopropyl alcohol | 4 |

The mixture is introduced through inlet 8 into the reaction vessel 1 at a rate such that a volume of liquid equal to the capacity of the system passes through the system every six hours. Hot water, steam, or other heating fluid is passed into or through jackets 19 and 20 to maintain the liquid temperatures in vessels 1 and 2 at the upper ends of these jackets at about 45° C. and about 85° C. respectively. Agitators 1, 2, 3, and 4 are rotated at about 800 R. P. M. to provide efficient agitation and maintain the two liquid phases in intimate contact during passage of the liquid through the apparatus. The reaction product passes through outlet 9 to decanter 10 wherein the aqueous phase settles and the unreacted hydrocarbon oil phase rises. Unreacted oil, for the most part paraffin hydrocarbons, is withdrawn at 11 and aqueous phase containing the desired water-soluble sulphitation products is withdrawn at 12. The aqueous product may be extracted with naphtha or other suitable organic solvent to eliminate residual hydrocarbons, distilled to remove residual naphtha, alcohol and water, and dried to yield a valuable detergent product.

For recovery of a single sulphitation product the above system will be operated with the valves on lines 5 and 6 open and the valves on lines 23 and 24 and 23' and 24' closed.

When it is desired to remove products of the preliminary treatment in vessel 1 separately from the products of the treatment in vessels 2, 3, and 4, the valve on line 5 may be closed and the valves on lines 23 and 24 opened to permit the mixture to enter decanter 22 and the valves on lines 25 and 26 opened to permit withdrawal of aqueous reaction mixture and addition of make-up sulphitation reagent.

On the other hand, when it is desired to remove products of the treatments in vessels 1 and 2 separately from the products of the treatments in vessels 3 and 4, the valve on line 5 may be closed and the valves on lines 23', 24', 25', and 26' opened.

In operations involving separate withdrawal of low temperature sulphitation products the proportion of sulphitation mixture introduced at 8 may be reduced advantageously to about 50% of the total and the balance may be added at 26 or 26'. Since the nitrosation product, though relatively insoluble in water, is soluble to some extent in the aqueous sulphitation product solution, the aqueous solution withdrawn at 25 or 25' will contain some nitrosation product. When the proportion of dissolved nitrosation product is high, for example when a highly concentrated nitrosation product has been employed, the aqueous product withdrawn at 25 or 25' may be further heated advantageously, with the addition of further sulphitation agent if required, to convert the contained nitrosation product to nitrosation sulphitation product and thereby enhance the yield of water-soluble product of the primary sulphitation.

Example 2

Two portions of a nitrosyl chloride addition product of an olefinic fraction obtained by the dehydrogenation of gas oil were sulphitated using for each portion a sulphitation reagent comprising, per mol of addition product, 3 mols $Na_2SO_3$, 1 mol $NaHSO_3$, 70 mols water, and 3 mols isopropyl alcohol. In test A the addition product was added to the sulphitation reagent during a period of about one hour while maintaining the reagent mixture between 85° C. and 90° C. The mixture was then maintained at 85° C. to 90° C. for twenty-three hours with agitation. In test B the reagent and addition product were mixed at 30° C. and the mixture was heated gradually to 85° C. in the course of one hour. The mixture was then maintained at 85° to 90° C. for twenty-three hours with agitation as in test B. In test A the yield of water-soluble detergent product was 55% and in test B, 61%. Thus the yield of detergent product was increased more than 10% by the low temperature treatment.

Example 3

Three portions of a nitrosyl chloride addition product of cetene were each mixed with a sulphitation reagent comprising 52 mols of water, 7.8 mols of methanol, and 3 mols of sodium sulphite per mol of addition product. Sample 1 was heated immediately to 85° C. and maintained at this reaction temperature for 24 hours. Sample 2 was heated to 60° C., maintained at this temperature for 3 hours, then heated to 85% C. and maintained at this temperature for 21 hours. Sample 3 was heated to 45° C. and maintained at this temperature for 3 hours, then heated to 85° C. and maintained at this temperature for 21 hours.

The yields of water-soluble sulphitation products from the three samples were respectively:

Sample 1, 56 mols per 100 mols of addition product;
Sample 2, 67 mols per 100 mols of addition product;
Sample 3, 69 mols per 100 mols of addition product.

The following examples further illustrate the practice of the present invention. For simplicity of disclosure, the examples have been set forth in tabular form. The general procedure for preparation of the products in each case was as follows:

A nitrosyl chloride addition product was prepared from each of the specified carboxylic-substituted olefins by passing nitrosyl chloride into the compound at the temperature and for the time period indicated in table. The number of gram atoms of nitrogen and chlorine introduced per mol of substituted olefin also is indicated in this table.

The reaction product, comprising the nitrosyl chloride addition product of the carboxylic-substituted olefin as well as unreacted material, was mixed with an aqueous sulphitation reagent and heated to a temperature between 84° C. and 100° C. for a period of time between 24 and 48 hours as indicated in the table. In each case the mixture was heated gradually to the indicated reaction temperature over a period of 1 hour. After completion of the sulphitation, two volumes water per volume sulphitation liquor were added and the resulting solution extracted 6 times with ethyl ether using about ½ part ether by volume per part original sulphitation liquor. Solid detergent was recovered from the extracted aqueous phase by use of a laboratory double drum drier.

*Table*

[Mass values are expressed in gram atoms or mols per mol of substituted olefin]

| | Example 4 | Example 5 | Example 6 |
|---|---|---|---|
| Olefinic material | n-Butyl oleate | Oleic acid | Allyl stearate |
| Mols NOCl passed | 2.5 | 2.5 | 2.5 |
| Nitrosation time hours | 4 | 4 | 4 |
| Nitrosation temp. °C | 25 | 25 | 25 |
| Gram atoms N introduced | 0.42 | 0.54 | 0.14 |
| Gram atoms Cl introduced | 1.18 | 1.06 | 0.28 |
| Mols Na$_2$SO$_3$ | 3 | 3 | 3 |
| Mols NaHSO$_3$ | 1 | 1 | 1 |
| Mols H$_2$O | 70 | 70 | 70 |
| Mols 2-propanol | 3 | 3 | 3 |
| Sulphitation time hours | 24 | 24 | 22 |
| Sulphitation temp. °C | 84 | 86 | 86 |
| Mol per cent yield on olefinic material | 67 | 85 | 63 |

I claim:

1. In the manufacture of nitrosation-sulphitation products involving sulphitation of a nitrosation product in a principal sulphitation step comprising heating at a sulphitation temperature, the improvement which comprises effecting partial sulphitation of the nitrosation product prior to said principal sulphitation step so as to convert between 10% and 50% of said nitrosation product to sulphitation product at a temperature between 15 and 85 centigrade degrees below the principal sulphitation temperature.

2. In the manufacture of sulphitation products involving sulphitation of a nitrosyl chloride addition product of an organic compound containing at least one non-aromatic C=C linkage by means of aqueous sulphite, the improvement which comprises reacting the nitrosyl chloride addition product with aqueous sulphite solution for at least ¼ hour at a temperature between 20° C. and 50° C. so as to effect partial sulphitation of the addition product and thereafter effecting sulphitation of the addition product with aqueous sulphite solution at a sulphitation temperature between 65° C. and 105° C.

3. In the manufacture of sulphitation products involving sulphitation of an olefin nitrosyl chloride addition product in a principal sulphitation step comprising heating at a sulphitation temperature, the improvement which comprises effecting partial sulphitation of the olefin nitrosyl chloride addition product, prior to said principal sulphitation step, so as to convert between 10% and 50% of said addition product to sulphitation product at a temperature between 15 and 85 centigrade degrees below the principal sulphitation temperature, separating water-soluble products from water-insoluble products and thereafter separately effecting sulphitation of water-insoluble products at the principal sulphitation temperature.

4. In the manufacture of sulphitation products involving sulphitation of a nitrosyl chloride addition product of an olefinic compound containing not less than 10 nor more than 30 carbon atoms per olefinic linkage by means of aqueous sulphite, the improvement which comprises reacting the olefin nitrosyl chloride addition product with aqueous sulphite solution for at least ¼ hour at a temperature between 20° C. and 50° C. so as to effect partial sulphitation of the addition product and thereafter raising the temperature of a mixture of the unsulphitated olefin nitrosyl chloride addition product in admixture with aqueous sulphite solution gradually at a rate not exceeding 2° C. per minute to a principal sulphitation temperature between 65° C. and 105° C. and effecting the balance of the sulphitation between 65° C. and 105° C.

5. In the manufacture of sulphitation products involving sulphitation of an olefin nitrosyl chloride addition product in a principal sulphitation step comprising heating at a sulphitation temperature, the improvement which comprises effecting partial sulphitation of the olefin nitrosyl chloride addition product, prior to said principal sulphitation step, so as to convert between 10% and 50% of said addition product to sulphitation product at a temperature between 15 and 85 centigrade degrees below the principal sulphitation temperature and thereafter subjecting the mixture of sulphitation products and olefin nitrosyl chloride addition product to sulphitation at the principal sulphitation temperature.

6. In the manufacture of sulphitation products involving sulphitation of a nitrosyl chloride addition product of an organic compound containing at least one non-aromatic C=C linkage and not less than 10 nor more than 30 carbon atoms per non-aromatic C=C linkage, by means of aqueous alkali sulphite, the improvement which comprises reacting the nitrosyl chloride addition product with aqueous alkali sulphite solution at temperatures rising gradually from an initial temperature between 20° C. and 50° C. to a principal reaction temperature between 65° C. and 105° C. and controlling the rate of temperature rise so that not less than 10% nor more than 50% of the sulphitation is effected at temperatures between 20° C. and 65° C. and the balance of the sulphitation is effected at temperatures between 65° C. and 105° C.

7. In the manufacture of sulphitation products involving sulphitation of the addition product of nitrosyl chloride and a mono-olefinic oil fraction consisting essentially of hydrocarbons containing not less than 10 nor more than 30 carbon atoms per molecule and obtained by thermolytic treatment of petroleum, in a principal sulphitation step comprising heating at a sulphitation temperature, the improvement which comprises effecting partial sulphitation of the nitrosyl chloride addition product, prior to said principal sulphitation step, for at least ¼ hour at a temperature between 15 and 85 centigrade degrees below the principal sulphitation temperature.

8. In the manufacture of sulphitation products involving sulphitation of the addition product of nitrosyl chloride and a mono-olefinic oil fraction, consisting essentially of hydrocarbons containing not less than 10 nor more than 30 carbon atoms per molecule and obtained by thermolytic treatment of petroleum, by means of aqueous sulphite, the improvement which comprises reacting the nitrosyl chloride addition product with aqueous sulphite solution for at least ¼ hour at a temperature between 20 C. and 50° C. so as to effect partial sulphitation of the addition product and thereafter raising the temperature of the mixture of nitrosyl chloride addition product and aqueous sulphite solution gradually at a rate not exceeding 2° C. per minute to a principal sulphitation temperature between 65° C. and 105° C. and effecting the balance of the sulphitation between 65° C. and 105° C.

9. In the manufacture of sulphitation products involving sulphitation of the addition product of nitrosyl chloride and a mono-olefinic oil fraction, consisting essentially of hydrocarbons containing not less than 10 nor more than 30 carbon atoms per molecule and obtained by thermolytic treatment of petroleum, in a principal sulphitation step comprising heating at a sulphitation temperature, the improvement which comprises effecting partial sulphitation of the nitrosyl chloride addition product, prior to said principal sulphitation step, so as to convert between 10% and 50% of said addition product to sulphitation product at a temperature between 15 and 85 centigrade degrees below the principal sulphitation temperature, separating water-soluble products from water-insoluble products, and thereafter separately effecting sulphitation of the water-insoluble products at the principal sulphitation temperature.

10. In the manufacture of sulphitation products involving sulphitation of the addition product of nitrosyl chloride and a mono-olefinic oil fraction, consisting essentially of hydrocarbons containing not less than 10 nor more than 30 carbon atoms per molecule and obtained by thermolytic treatment of petroleum, by means of aqueous sulphite, the improvement which comprises reacting the nitrosyl chloride addition product with aqueous sulphite solution for at least ¼ hour at a temperature between 20° C. and 50° C. so as to effect partial sulphitation of the addition product and thereafter effecting sulphitation of the addition product with aqueous sulphite solution containing water-soluble sulphitation products of the low temperature sulphitation, at a sulphitation temperature between 65° C. and 105° C.

LELAND JAMES BECKHAM.